(No Model.)  3 Sheets—Sheet 1.
A. W. JUDD.
CLOTH MEASURING AND CUTTING MACHINE.
No. 244,253. Patented July 12, 1881.
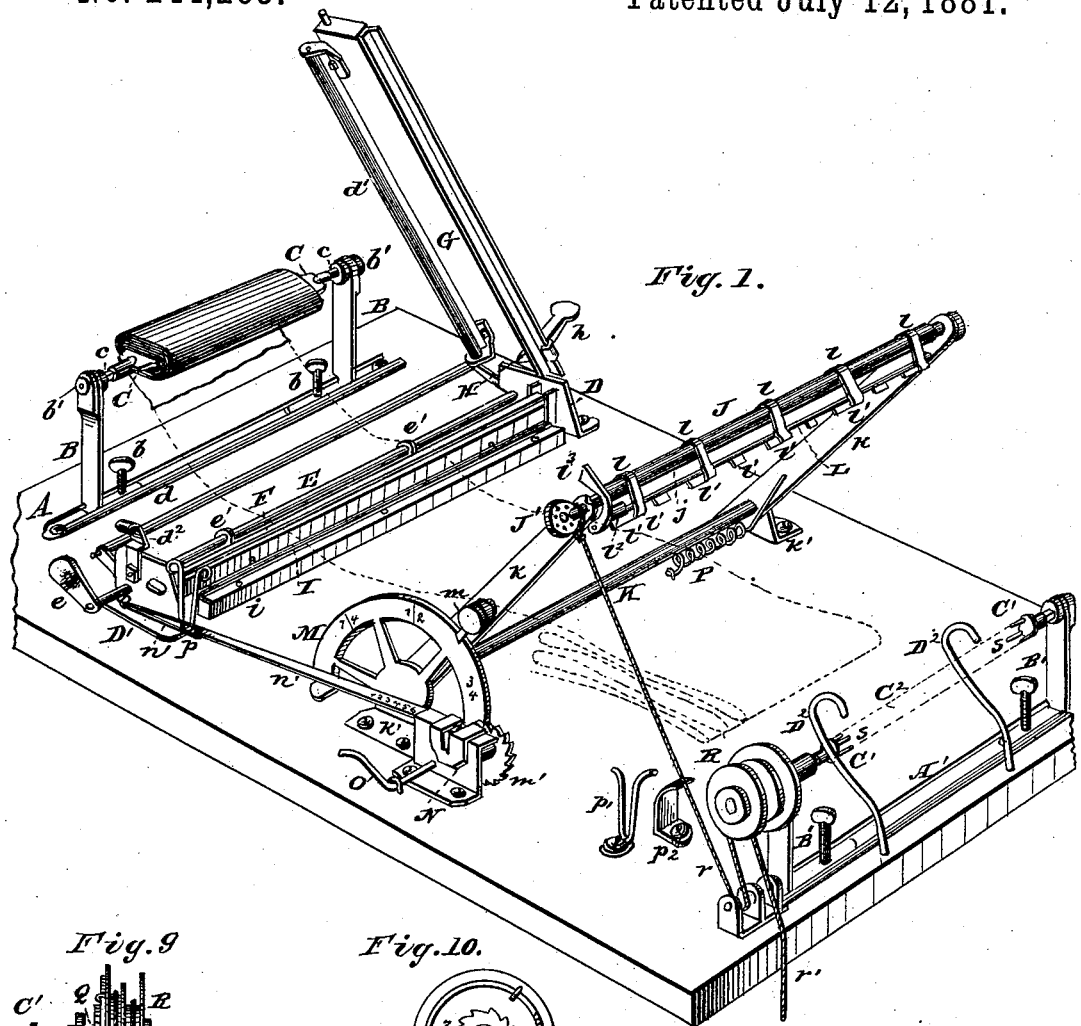
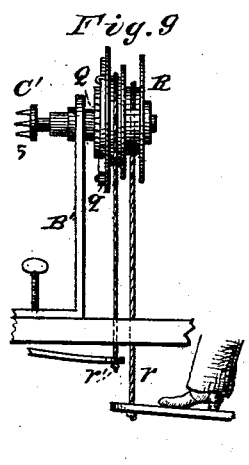
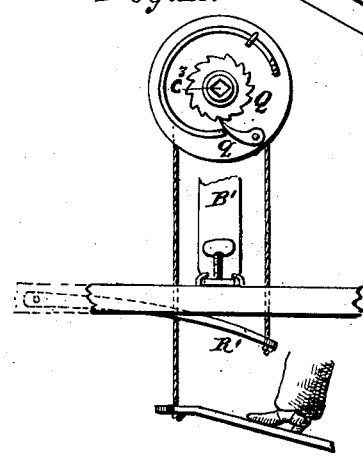
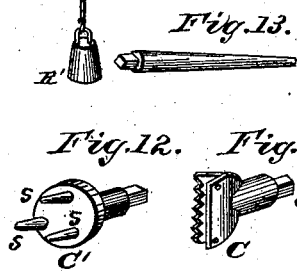
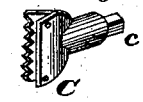
WITNESSES
Fred. G. Dieterich.
P. C. Dieterich.
By his Attorney
INVENTOR
Amos Wilson Judd.
DeWitt C. Allen (No Model.)

3 Sheets—Sheet 2.

A. W. JUDD.
CLOTH MEASURING AND CUTTING MACHINE.

No. 244,253.

Patented July 12, 1881.

WITNESSES

INVENTOR

By his Attorney (No Model.)   3 Sheets—Sheet 3.
A. W. JUDD.
CLOTH MEASURING AND CUTTING MACHINE.
No. 244,253. Patented July 12, 1881.
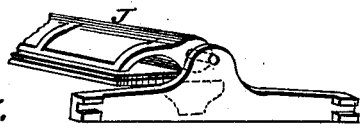
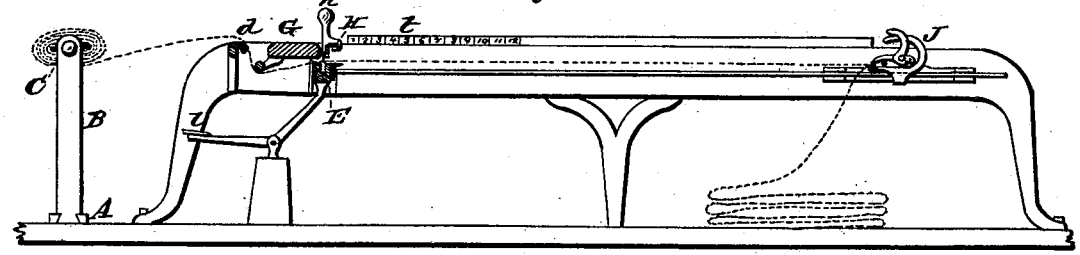
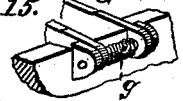
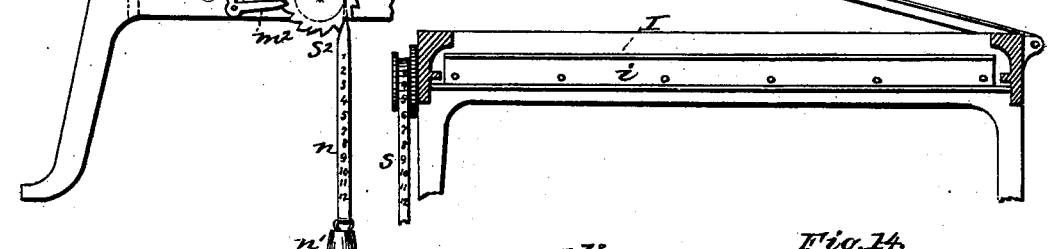
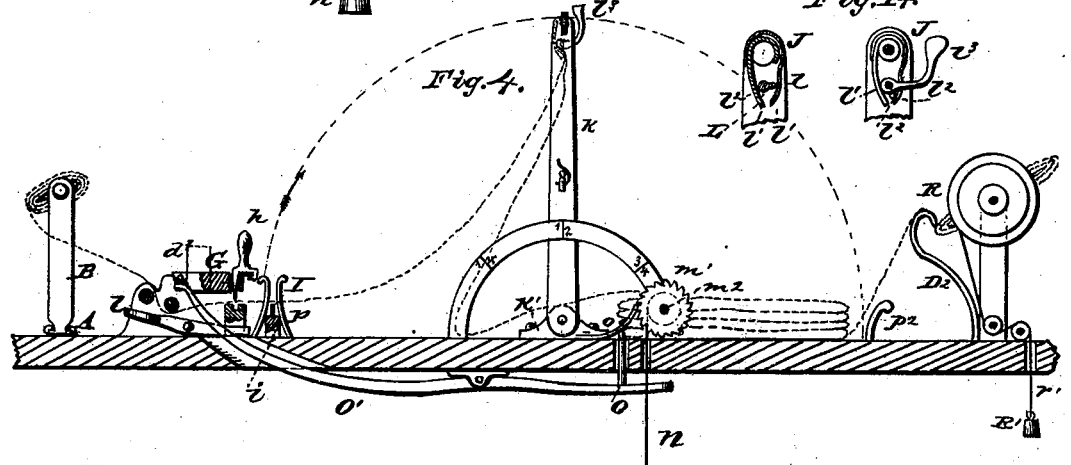
WITNESSES
Fred G. Dieterich
P. C. Dieterich
By his Attorney
INVENTOR
Amos Wilson Judd
DeWitt C. Allen
N. PETERS, Photo-Lithographer, Washington, D. C.

UNITED STATES PATENT OFFICE.

AMOS W. JUDD, OF CHATTANOOGA, TENNESSEE.

CLOTH MEASURING AND CUTTING MACHINE.

SPECIFICATION forming part of Letters Patent No. 244,253, dated July 12, 1881.

Application filed April 12, 1881. (No model.)

*To all whom it may concern:*

Be it known that I, AMOS W. JUDD, a citizen of the United States, residing at Chattanooga, in the county of Hamilton and State of Tennessee, have invented certain new and useful Improvements in Machines for Measuring and Cutting Dry-Goods, &c.; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to certain new and useful improvements in machines to be applied to counters, and especially designed for measuring and retailing fabrics of various descriptions, and also taking stock, and is intended particularly for general use in dry-goods stores, and other like establishments; and the invention consists, essentially, in novel means for unrolling, measuring, and cutting fabrics of various descriptions in retailing.

It also consists in novel means for unrolling, measuring, and rerolling up fabrics of various descriptions in taking stock.

It further consists in novel features of construction and combination and arrangement of parts, all as will be hereinafter fully described, and specifically pointed out in the claims.

Figure 2:
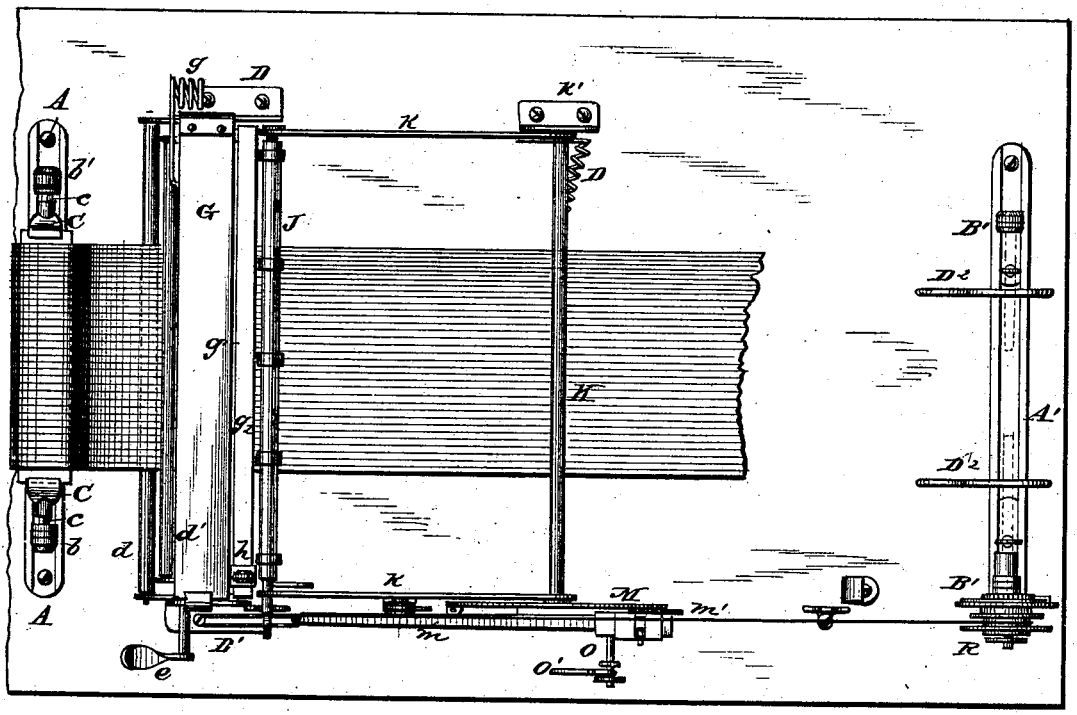
Figure 3:
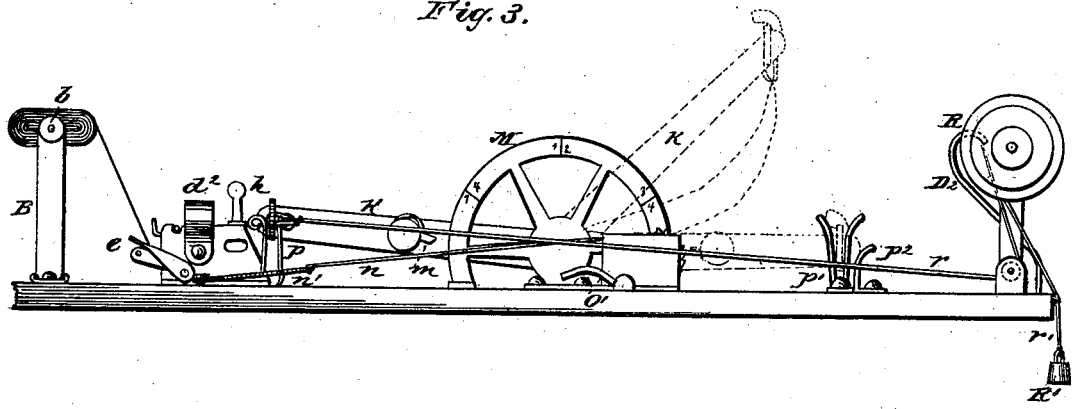

Referring to the accompanying drawings, Figure 1 represents a perspective view of my improved machine, with the knife-frame and swinging-clamp in raised positions. Fig. 2 is a top view or plan of the same. Fig. 3 is a side elevation. Fig. 4 is a longitudinal vertical section. Fig. 5 is a longitudinal vertical section of a modification of my improved machine; Fig. 6, a cross-section of the same; Fig. 7, a sectional side elevation; Fig. 8, detail sectional view of sliding clamp; Figs. 9 and 10, detail views of modifications for operating the revolving mechanism; Figs. 11, 12, 13, 14, 15, and 16, different detail views.

In the drawings, A represents a grooved plate or way, secured on a counter or other suitable place, and in which are arranged movable uprights B B, and which are adjustably secured therein by set-screws $b\ b$. In the upper ends of these uprights are arranged loose bearings or journals $b'\ b'$, having square journal-holes for the reception of the square shanks $c\ c$ of the two chucks or serrated and spring-clamping plates C C, which are adapted to grasp the ends of the board upon which the fabrics are usually rolled, the adjustment of the uprights B B permitting of their being moved toward or from each other, in order to adapt the chucks or clamping-plates to different widths of fabrics.

D D' represent two metallic bearing-plates, also secured on the counter or other suitable place in front of the grooved plate or way A. In these plates D D' a transverse roller, $d$, is journaled, which, in connection with a transverse roller, $d'$, secured to the knife-frame, will produce or give the requisite tension to the fabric during the operation of measuring the same for retailing or in taking stock.

E represents a transverse shaft, also journaled in the metallic plates D D', and provided at one end with a hand-lever, $e$, for operating it, and two projecting arms, $e'\ e'$, upon which a slotted bed-plate, F, rests, and in which a movable knife works in cutting the fabric after having taken the right measure.

G represents a transverse frame, pivoted at one end to the upright D, and its other or free end adapted to engage with a spring-catch, $d^2$, connected to plate D', for securing said frame down in position on the counter, and a spring, $g$, connected to the frame at its pivotal end, by which it is thrown open and upward (see Fig. 1) when disengaged from the spring-catch $d^2$. This frame G is provided with a longitudinal slot, $g'$, and guide $g^2$, upon which the knife H is mounted, said knife passing down through the slot $g'$, and provided with an upwardly-projecting handle, $h$, by which it can be moved lengthwise of the frame and across the fabric to be cut, which passes between the knife-frame G and the bed-plate F, said bed-plate being adjusted up against the knife-frame (through the medium of the hand-lever $e$, shaft E, and arms $e'\ e'$, upon which said bed-plate is supported or rests) for securing the fabric in position during the operation of cutting.

I represents a metallic strip secured to and projecting above a transverse wooden bar, $i$, arranged just in advance of the knife-frame G, for a purpose to be hereinafter fully described.

J represents a movable clamp for holding and carrying the fabrics during the operation of measuring. This clamp is composed of a transverse slotted or open tube, $j$, journaled in the ends of arms $k\ k$, which are secured to a shaft, K, loosely mounted in bearing-plates $k'\ k'$, secured to the counter or other suitable place a short distance in front of the metallic strip I. The clamp J has a series of spring-clips, formed by the springs $l$, secured to the outer side of the tube $j$, and a series of projecting plates, $l'$, between which and the free ends of the springs $l$ the fabric to be measured is grasped, said spring-clips being opened and closed for releasing and securing the fabric by means of a series of cams, $l^2$, mounted on a transverse pivoted rod or bar, L, secured in the slot or opening in said tube $j$, and provided with an operating hand-lever, $l^3$, all as clearly shown in Figs. 1 and 4.

One of the bearing-plates $k'$ has secured thereto or formed therewith a semicircular plate, M, having figures arranged thereon for denoting the fractions of a yard. The clamp J describes a half-circle in its movement, which corresponds to the distance of one yard, and one of the arms $k$ is provided with a pawl, $m$, adapted to engage with a ratchet-wheel, $m'$, mounted on one end of a shaft carrying a pulley or wheel, $m^2$, arranged in a case, N. Upon this pulley or wheel is wound a tape-measure, $n$, which will indicate or register the number of yards measured off, said tape-measure having its free end secured to a retracting spring or weight, $n'$, by which it can be drawn or thrown back to its original or blank position when the desired quantity of fabric has been measured and cut off.

A spring-pawl, $o$, engaging the ratchet-wheel $m'$, prevents its being turned backward during the operation of measuring off the desired quantity of fabric, but which is released or thrown out of engagement therewith through the medium of a pivoted lever, O, and a connecting-lever, O', arranged under the counter, and adapted to be operated by the spring-catch $d^2$ after the cloth has been cut and during the operation of releasing the knife-frame G from engagement with said spring-catch, all as clearly shown in Fig. 4.

P represents a spring connected to the counter and to one of the arms $k$, so that when the clamp is moved and secured to the left in front of the knife-frame G the tension of said spring will be increased, and when a button, J', on the end of the clamp J is released from the spring-catch $p$ said clamp will be automatically carried over to the right and the button J' thereof engage with a similar clip, $p'$.

$p^2$ represents a post arranged near the spring-catch $p'$, and with which the hand-lever $l^2$ of the pivoted cam rod or bar L engages as the clamp J is thrown or carried over to the right, which automatically throws open the spring-clips through the medium of the cams $l^2$ on the rod or bar L, thus releasing the fabric.

The operation of my invention for measuring and cutting off fabrics in retailing is as follows: The board upon which the cloth or fabric is wound in the bolt is properly centered between the uprights B B and the ends of said board held by the chucks or serrated and spring clamping-plates C C. The knife-frame G is then thrown open and the free end of the cloth or fabric carried forward over the edge of the metallic strip I, when the knife-frame is turned down and secured in position by the spring-catch $d^2$, so that the cloth or fabric passes between the tension-rollers $d\ d'$. The button J' is now taken between the thumb and second finger, with the button in a perpendicular position, and the clamp J carried over to the right until the hand-lever $l^2$ strikes the post $p^2$, thus automatically opening the spring-clips. The clamp J is then turned or swung back to the left as far as it will go down, so that the spring-clips will pass down over the upper edge of the metallic strip I. Then with the first finger press down on the hand-lever $l^2$, which will close the spring-clips and cause them to grasp the metallic strip I and the cloth or fabric which had been previously laid over the upper edge of said strip I. The clamp J is then carried or swung over to the right, the spring-clips retaining the cloth or fabric until the hand-lever $l^2$ strikes the post $p^2$, by which the cloth or fabric is released from the spring-clips, and thus one yard is measured off and registered by the pawl $m$ engaging the ratchet-wheel $m'$ and moving it one notch, which rolls up the tape-measure on the pulley or wheel $m^2$ sufficiently to indicate thereon one yard.

The above-described operation of the clamp G is repeated for each yard, and for fractions of a yard the clamp J is stopped at the desired point indicated on the semicircular plate M. The clamp is then held in this position by the right hand until the slotted bed F is pressed upward against the knife-frame G by pressing down on the lever $e$ with the left hand, which will hold the cloth and prevent its being further unwound. The right hand can then be taken off from the clamp and used for drawing the knife across the cloth or fabric, thus cutting it off. The knife-frame, being then released from the spring-catch $d^2$, will be thrown up out of the way by its actuating-spring, which also permits the registering-tape to be run back to its original position, as before described.

It will be observed that the cloth or fabric, while being measured off by the above-described means, is also laid in a folded condition upon the counter, as clearly shown in Fig. 1.

In Fig. 1 I have represented an attachment for rerolling up fabrics after measuring in taking stock, and which is composed of a grooved plate or way, A', having adjustable uprights B' B' and chucks or serrated and spring-clamping plates C' C', in which a board, C², (upon which the fabric to be rerolled,) is clasped, similar to the arrangement upon which the board is clasped in unrolling the fabric to be measured. This attachment is provided at one end, or to one of the journals $c^3$ of the upright B' is connected a ratchet-wheel, Q, and a spring-pawl, $q$, adapted to engage therewith, is connected with a double pulley, R, having two cords, $r\ r'$, connected thereto, said cords $r\ r'$ having their free ends connected respectively with the clamp J and the retracting spring or weight R', so that in carrying or swinging the clamp J from the right to the left it will turn the double pulley, and thus the board $C^2$, and wind or roll the fabric thereon. The return movement of the clamp from left to right permits the retracting spring or weight R to turn the double pulley in the opposite direction, and thus wind up the slack of the rope $r$ connected to the clamp, while the spring-pawl $q$, engaging with the ratchet-wheel Q, prevents the board $C^2$ from turning backward.

$D^2\ D^2$ represent curved springs that rest against the fabric being rerolled and hold it in proper position, so that the ratchet-wheel will work and keep the fabric from unrolling.

Instead of connecting the cord $r$ to the clamp J, it may be connected to and operated by a foot-treadle arranged under the counter, as shown in Figs. 9 and 10.

It will be observed that the chucks shown in the attachment are provided with three projecting points or prongs, $s$, between which the ends of a roller or bar can be secured or held in rerolling fabrics, while in Figs. 2 and 13 I have shown a pointed rod with a square shank, said pointed end being inserted in bolts of cloth that are not wound on a board or stick.

Figs. 5, 6, and 7 represent a modification of my machine, in which the clamp J is arranged to work in guides formed in the sides of a frame, and a sufficient distance forward in said guides to measure one yard, and which clamp is provided with a stud or pawl, $s'$, adapted to engage with a ratchet-wheel, $s^2$, in its backward movement, and thus indicate the yards of fabric as they are measured off, in a manner similar to the swinging clamp before referred to, and also a measure, $t$, running along the side of the frame, to indicate the fractions of a yard.

The frame or counter upon which the machine is secured or placed can be provided with figures, so that the fabrics can be cut bias, when desired, by slipping the fabric under the knife-frame on one side.

Strips of wood or metal may be substituted for the rollers $d\ d'$ to give the proper tension to the cloth. Any form of spring-clamps may be used for holding the fabric during the operation of measuring, and operated by hand or suitable cams or levers, and for measuring carpets the clamps may be arranged at the ends, one of which is shown in Figs. 5 and 8.

I do not wish to limit myself to the precise construction and arrangement of parts herein shown and described, as they may be modified in various ways without departing from the spirit of my invention.

Having thus fully described my invention, what I claim, and desire to secure by Letters Patent, is—

1. In a machine for measuring fabrics, the combination, with mechanism for holding a bolt of fabric, of a movable clamp adapted to be moved toward and from said holding mechanism, and to which the fabric is adapted to be secured, and registering mechanism adapted to be operated by said clamp, substantially as and for the purpose specified.

2. In a machine for measuring fabrics, the combination, with mechanism for holding a bolt of cloth, of a swinging clamp and registering mechanism adapted to be operated through the movement of said clamp, substantially in the manner as and for the purpose herein shown and described.

3. In a machine for measuring and cutting fabrics, the combination, with mechanism for holding a bolt of fabric, of a clamp to which said fabric may be secured and adapted to be moved toward and from said holding mechanism, intermediate cutting mechanism, and registering mechanism adapted to be operated through the movement of said clamp, substantially in the manner herein shown and described.

4. In a machine for measuring and cutting fabrics, the combination, with mechanism for holding a bolt of fabric, of a swinging clamp to which said fabric may be secured, intermediate cutting mechanism, and registering mechanism adapted to be operated through the movement of said swinging clamp, substantially in the manner herein shown and described.

5. In a machine for measuring fabrics, the combination, with holding mechanism, of a movable or swinging clamp to which said fabric is adapted to be secured, registering mechanism adapted to be operated through the movement of said clamp, and mechanism for rerolling said fabric, substantially in the manner herein shown and described.

6. In a machine for measuring and cutting fabrics, the combination, with a pivoted knife-frame, G, of a vertically-adjustable bed-plate, F, between which and said knife-frame the fabric is clamped during the operation of cutting the fabric, substantially in the manner herein shown and described.

7. In a machine for measuring and cutting fabrics, the combination, with the mechanism for holding a bolt of fabric, of the roller $d$ and pivoted knife-frame G, provided with the roller $d'$, and a clamp, J, adapted to be moved toward and from said knife-frame, substantially in the manner herein shown and described.

8. In a machine for measuring cloth or other fabrics, the combination, with mechanism for holding a bolt of fabric, of the stationary transverse metallic strip, I, and a movable clamp having a series of spring-clips and means for opening and closing them during the forward and return movements of said clamp for releasing and securing the fabric therein, substantially in the manner herein shown and described.

9. In a machine for measuring and cutting fabrics, the combination, with mechanism for holding a bolt of fabric and cutting and registering mechanisms, of a movable or swinging clamp adapted to carry the fabric forward and fold it during the measuring operation, substantially in the manner herein shown and described.

10. In a machine for measuring and cutting fabrics, the combination, with a knife-frame pivoted at one end and measuring and registering mechanisms, of mechanism adapted to be operated by the spring-catch that holds the knife-frame in working position for releasing said registering mechanism after the desired quantity of fabric has been measured and cut off and during the operation of releasing the knife-frame, substantially as and for the purpose herein shown and described.

11. In a machine for measuring and cutting fabrics, the knife-frame G, pivoted at one end, a spring-catch, $d^2$, for securing said knife-frame down in a horizontal position, and an actuating-spring, $g$, for automatically throwing said knife-frame upward and out of the way when released from said spring-catch, substantially as shown and described.

12. In a machine for measuring fabrics, the combination, with mechanism for holding a bolt of fabric and giving it the proper tension, of a swinging clamp and a spring connected thereto and adapted to automatically throw said clamp forward after the fabric has been connected thereto, substantially in the manner herein shown and described.

13. In a machine for measuring fabrics, a movable or swinging clamp composed of a slotted or open tube, $j$, a series of spring-clips formed by the springs $l$ and projecting plates $l'$, and a pivoted rod or bar, L, provided with a series of cams for opening said clips, and an operating-lever, $l^3$, all arranged relatively to each other, substantially in the manner herein shown and described.

14. In a machine for measuring fabrics, a movable or swinging clamp provided with a series of spring-clips, pivoted rod L, having a series of cams, $l^2$, and a hand-lever, $l^3$, for opening said clips, in combination with a post, $p^2$, with which the mechanism for opening said clips engages during the forward movement of said clamp, thereby automatically opening said clips for releasing the fabric, substantially in the manner herein shown and described.

15. In a machine for measuring cloth, the combination, with mechanism for holding the bolt of fabric and mechanism for rerolling said fabric, of a movable or swinging clamp adapted to carry the fabric forward and a cord connecting said rerolling mechanism with said clamp, whereby in the backward or return movement of said clamp, the rerolling mechanism will be operated, substantially in the manner herein shown and described.

16. In a machine for measuring cloth, the combination, with mechanism for holding the bolt or fabric and mechanism for rerolling said fabric, of an intermediate clamp adapted to be moved toward and from both the fabric-holding mechanism and the rerolling mechanism, substantially as and for the purpose herein shown and described.

17. In a machine for measuring fabrics, the combination, with a swinging clamp and registering mechanism, of a semicircular plate having figures thereon for denoting the fractions of a yard, substantially as and for the purpose herein shown and described.

In testimony whereof I affix my signature in presence of two witnesses.

AMOS WILSON JUDD.

Witnesses:
SAMUEL HUGHS,
J. E. CONNER.